United States Patent Office 3,410,806
Patented Nov. 12, 1968

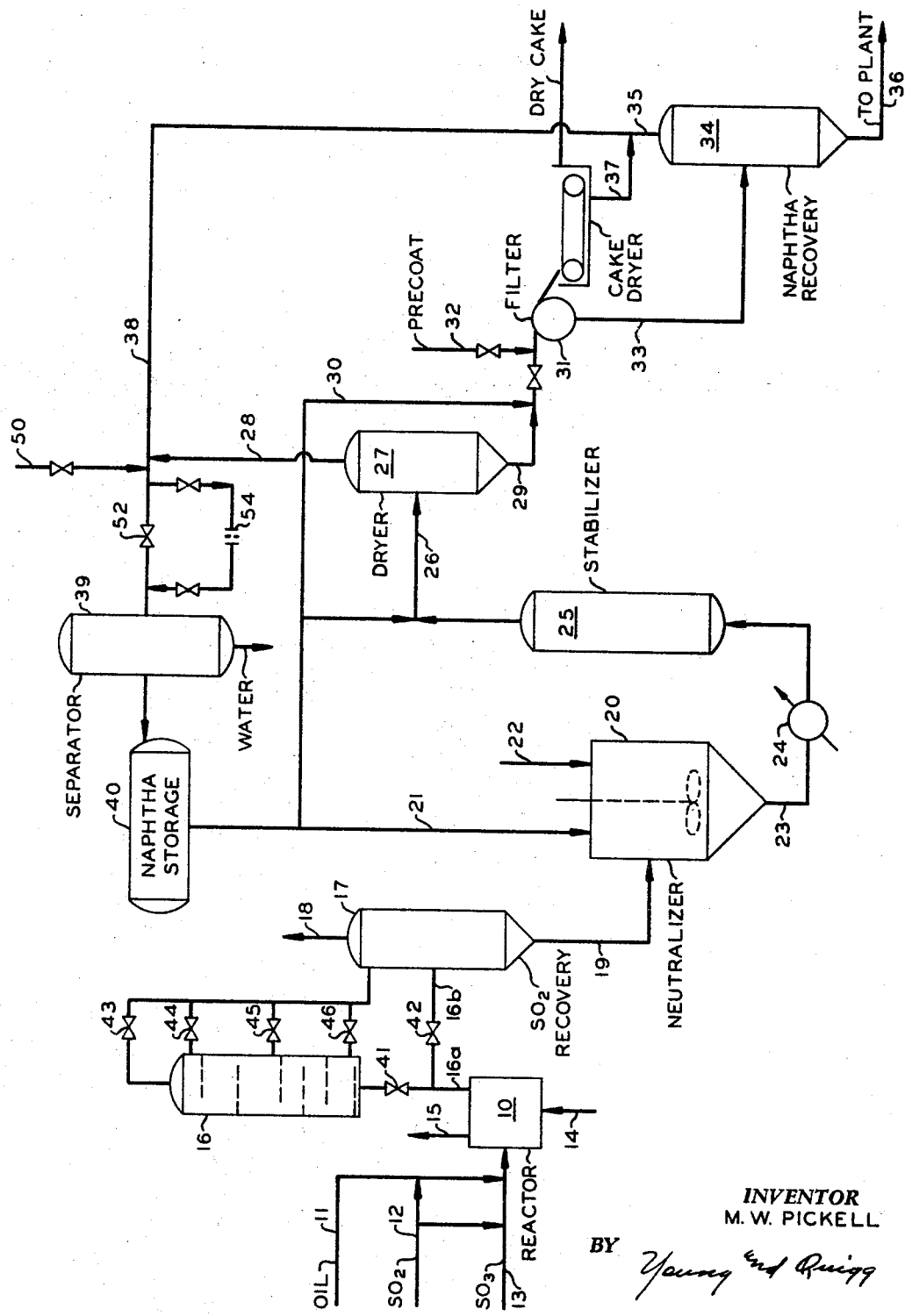

3,410,806
RESOLVING EMULSIONS
Marion W. Pickell, Bartlesville, Okla., assignor to Phillips Petroleum Company, a corporation of Delaware
Filed Jan. 4, 1965, Ser. No. 423,204
11 Claims. (Cl. 252—329)

ABSTRACT OF THE DISCLOSURE

Water-in-oil emulsions are resolved by adding thereto an emulsion treating agent comprising an alkali metal tallate soap and an alkali metal hydroxide.

This invention relates to the resolving of emulsions. In one aspect this invention relates to treating agents for resolving emulsions. In another aspect this invention relates to a method for resolving emulsions.

Emulsions are a source of much difficulty and economic loss in many industries. The formation of an undesired emulsion in a manufacturing process invariably leads to increased operating costs. If the stream involved is a main processing stream, steps must be taken to recover the product or raw material from the emulsion. If the stream is merely a waste stream, then said stream must be treated to resolve the emulsion before it can be disposed of, as by discharge to sewers. Very frequently said difficulties not only lead to increased costs but also increased investment costs due to the additional equipment needed to treat and/or otherwise handle the emulsion.

Thus, there is a constant search for new emulsion treating agents, and any new treating agent or emulsion breaking agent represents a definite contribution to the art.

The present invention provides a new treating agent or emulsion breaking agent which is particularly effective in resolving emulsions of the water-in-oil type. I have discovered that alkali metal tallate soaps and alkali metal hydroxides when used together in combination provide an efficient treating agent for resolving water-in-oil type emulsions. Thus, broadly speaking, the present invention resides in an emulsion treating agent comprising an alkali metal tallate soap and an alkali metal hydroxide; and methods of resolving an emulsion which comprises adding said alkali metal tallate soap and said alkali metal hydroxide to said emulsion.

An object of this invention is to provide new treating agents for resolving emulsions. Another object of this invention is to provide new treating agents which are particularly effective for resolving emulsions of the water-in-oil type. Another object of this invention is to provide new emulsion treating agents comprising combinations of alkali metal tallate soaps and alkali metal hydroxides. Another object of this invention is to provide methods of resolving emulsions comprising adding said treating agents to said emulsions. Another object of this invention is to provide a method of resolving an emulsion which comprises adding to said emulsion an alkali metal tallate soap and an alkali metal hydroxide. Other aspects, objects, and advantages of the invention will be apparent to those skilled in the art in view of this disclosure.

Thus, according to the invention, there is provided a process for resolving an emulsion to enable recovery of the components thereof, which process comprises: adding an alkali metal tallate soap to said emulsion; adding an alkali metal hydroxide to said emulsion; said soap and said hydroxide being added in a soap to hydroxide weight ratio within the range of from 1:9 to 9:1, and in a small but effective total amount which is sufficient to substantially completely resolve said emulsion.

Further, according to the invention, there is provided an emulsion treating agent comprising from 10 to 90 weight percent of an alakli metal tallate soap and from 90 to 10 weight percent of an alakli metal hydroxide.

The alkali metal tallate soaps, when used alone, are not efficient treating agents for resolving water-in-oil emulsions. While said tallate soaps do have some effect in resolving said emulsions, they are too slow in their action to be of any value commercially. The alkali metal hydroxides, when used alone, have little or no effect in resolving water-in-oil emulsions. Thus, it was surprising that when an alkali metal tallate soap and an alkali metal hydroxide are used in combination, the combination is a very efficient treating agent for resolving emulsions of the water-in-oil type. The data given in the examples hereinafter clearly show that when an alkali metal tallate soap and an alkali metal hydroxide are used together, the combination is a much more effective treating agent than either said soap or said hydroxide used alone. Thus, there is apparently obtained a synergistic effect between said soap and said hydroxide. Said data clearly demonstrate this synergistic effect.

In the practice of the invention, said alkali metal tallate soap and said alkali metal hydroxide can be used in any weight ratio with respect to each other which will obtain said synergistic effect and which is effective in resolving the emulsion being treated. Uusually, said soap and said hydroxide are used in a soap to hydroxide weight ratio within the range of from 1:9 to 9:1, preferably within the range of from about 1:1 to about 1:3. However, as discussed hereinafter, it is within the scope of the invention to use said soap and said hydroxide in weight ratios which are outside of the above-stated ranges.

The total amount of said alkali metal tallate soap and said alkali metal hydroxide, i.e., the sum of the individual amounts of said soap and said hydroxide used in accordance with said ranges of weight ratios, which can be used in the practice of the invention is a small but effective amount which is sufficient to substantially completely resolve the emulsion being treated. The actual numerical values of said total mount will usually be dictated by economic considerations. For example, one will ordinarily use the smallest amount of the treating agents which will be effective in resolving the emulsion in a reasonable period of time, e.g., up to about 20 hours. On the other hand, one would seldom use an amount of said treating agents which cost more than the value of the components of the emulsion being treated. Usually, said total amount will be an amount within the range of from 0.1 to 3, preferably from 0.2 to 1, more preferably from 0.3 to 0.75, weight percent of the emulsion being treated. However, as discussed hereinafter, it is within the scope of the invention to use total amounts of said soap and said hydroxide which are outside said ranges.

Tall oil is a by-product obtained from the sulfate and soda digestion of wood pulp, e.g., pine wood, in the manufacture of kraft paper. Said tall oil in crude form comprises a complex mixture of rosin acids, fatty acids, and unsaponifiable materials. It is usually dark in color and contains various insoluble resinous components. Said crude tall oil is thus a valuable source of fatty acids and rosin acids, and can be fractionally distilled to yield various cuts of fattey acids, rosin acids, tall oil rosin, broader cuts identified as distilled tall oil, a residue identified as tall oil pitch, etc. These products are available commercially under the trade name "Acintol" from Arizona Chemical Company, 101 W. 50th St., New York 20, N.Y. One example of such a product is Acintol D29LR Distilled Tall Oil. This material has the following typical composition, in weight percent: moisture, less than 0.1; ash, less than 0.001; rosin acids, 29.0; unsaponifiables, 2.2; and total fatty acids, 68.8. Said fatty acid composition can be broken down, in weight percent, as follows: polyunsaturated, conjugated, as linoleic, 8; polyunsaturated, nonconjugated, as linoleic, 36; oleic, by difference, 52; and saturated, 4. The fatty acids and rosin acids in said distilled product can be saponified in known manner with alkali metal hydroxides to give alkali metal tallate soaps.

Thus, one presently preferred method for preparing the alkali metal tallate soaps used in the practice of this invention comprises preparing an aqueous solution of an alkali metal hydroxide and slowly adding said solution to a mixture of the desired quantity of distilled tall oil and water to give a resulting solution containing from about 10 to 25 weight percent of the resulting alkali metal tallate soap. More water can be used to give a more dilute solution, if desired. Generally speaking, it is preferred not to use smaller quantities of water because the soap solution becomes viscous and is inconvenient to handle. The preparation of said alkali metal tallate soaps is further illustrated in the examples given hereinafter.

As used herein and in the claims, unless otherwise specified, the term "alkali metals" includes the metals sodium, potassium, lithium, cesium, rubidium, and francium. Because of availability and price, the hydroxides of sodium and potassium are preferred for use in the practice of the invention, both as the hydroxide per se, and in the preparation of the alkali metal tallate soaps. Sodium hydroxide is the most preferred alkali metal hydroxide. Accordingly, the above-described weight ratios of alkali metal tallate soap to alkali metal hydroxide, and the above-described total amount of said soap and said hydroxide, are set forth on the basis of using sodium hydroxide. As will be understood by those skilled in the art in view of this disclosure, said weight ratios and said total amount, being expressed on a weight basis, will vary as the metal cation in the alkali metal hydroxide varies. For example, the ratio of the molecular weight of potassium hydroxide (approx. 56) to the molecular weight of sodium hydroxide (approx. 40) is approximately 1.4. Thus, it will require about 1.4 times as much potassium hydroxide as sodium hydroxide to supply the same chemically equivalent amount of OH ion, both in the preparation of the alkali metal tallate soaps and in the use of the alkali metal hydroxide per se as one of the treating agents. Corresponding variations or chemically equivalent amounts can be readily calculated for the other alkali metals. Such variations in said weight ratios and said total amount of soap and hydroxide are certainly within the scope of the invention. Therefore, the specific ranges set forth above for said weight ratios and said total amount of said alkali metal tallate soap and said alkali metal hydroxide should not be considered as unduly limiting on the invention.

The above-described alkali metal hydroxides and alkali metal tallate soaps used together or in combination in the practice of the invention can be added to, mixed with, or incorporated in the emulsion being treated in any suitable manner. For example, said hydroxides and said soap can be added separately or simultaneously, as by being mixed together. Said hydroxides and said soap can be added in dry form if desired, but preferably they are added in the form of aqueous solutions. The concentration of said aqueous solutions is not critical and can range from about 1 to 30 weight percent, preferably 10 to 25 weight percent, for the soap, and from about 1 to 50 weight percent, preferably about 10 to 30 weight percent, for the hydroxide. Although not critical, it is generally preferred that said soap and said hydroxide be added to the emulsion separately, with the hydroxide being added first. Mild agitation, although not essential, is frequently preferred for dispersing said treating agents in the emulsion and thereby accelerating their action. It is preferred, but not essential, that the same alkali metal be present in a said hydroxide and a said tallate soap used in the practice of the invention, e.g., sodium hydroxide be used with sodium tallate soap, etc.

For convenience, all amounts of said soap and said hydroxide used in the practice of the invention as described herein are expressed on the basis of the dry weight of said soap and said hydroxide, and are further expressed in terms of weight percent of the emulsion being treated.

Pressure and temperature are not critical in treating emulsions with the treating agents of the invention. The pressure is usually substantially atmospheric. However, superatmospheric and subatmospheric pressures can be employed. Mildly elevated temperatures, e.g., up to about 150° F., frequently aid in resolving the emulsions. Usually, however, satisfactory results can be obtained at substantially ambient temperatures, e.g., 75 to 100° F. Generally speaking, lower temperatures result in slower action of the treating agents.

As indicated above, the treating agents of the invention are particularly applicable in the resolving of water-in-oil emulsions. In order to further illustrate the invention, and as an example of one application of the invention, said invention will be further described as applied in the manufacture of metal petroleum sulfonates. In U.S. Patent 3,135,693, issued June 2, 1964 to W. B. Whitney et al., there is disclosed and claimed a process for making petroleum sulfonates, and the use of said sulfonates in the preparation of lubricating oil compositions. Broadly, the invention of said Patent 3,135,693 contemplates sulfonating a highly refined, high molecular weight petroleum fraction with liquid $SO_3$ dissolved in an inorganic solvent, neutralizing the reaction mixture with the carbonate, oxide or hydroxide of a metal, heat treating the neutralization reaction mixture to stabilize the sulfonate with respect to ferrous corrosion, expelling moisture, removing unreacted inorganic salts and solids, and recovering a mixture of metal sulfonate and product oil, i.e., $SO_3$ treated bright stock, as the products; or blending the resulting composition with additional product oil resulting from a sulfonation reaction as described above. The product oil resulting from such sulfonation process has superior lubricating oil qualities with respect to octane requirement increase values.

All metals are suitable for preparing the petroleum sulfonates. However, the alkaline earth metals are preferred and calcium is especially preferred. The basic compounds, e.g., carbonates, oxides, and hydroxides, of said metals used.

Suitable petroleum fractions which can be used in the preparation of said metal petroleum sulfonates include the more viscous bright stock fractions of petroleum. A pe- All other runs were carried out at room temperature, about 75 to 80° F. The amount and type of treating agent, settling times, and amount of emulsion broken are set forth in Table I below.

TABLE I

| Run No. | Treating Agent Used | | Settling Time, minutes | Percent of Emulsion Broken |
|---|---|---|---|---|
| | Type | Wt. Percent [1] | | |
| 1 | Sodium tallate soap | 0.2 | 20 to 30 | 50 |
| 2 | Potassium tallate soap | 0.2 | 20 to 30 | 50 |
| 3 | Triton X-114 [2] | 0.2 | 15 to 20 | 50 [3] |
| 4 | Sodium hydroxide | 0.1 | 120 | 0 |
| 5 | do | 0.25 | 120 | 0 |
| 6 | Potassium hydroxide | 0.25 | 120 | 0 |
| 7 | Combination of: Sodium hydroxide and Sodium tallate soap | 0.25 / 0.3 | 0.5 to 1 | 90 |
| 8 | Combination of: Sodium hydroxide and Sodium tallate soap | 0.25 / 0.3 | 5 to 10 | 85 |
| 9 | Nalcamine C.A.E. [4] | 0.2 | 10 to 20 | 50 |

[1] Dry basis, based on weight of emulsion.
[2] Commercial product. An alkyl aryl polyether alcohol.
[3] Tends to re-emulsify.
[4] Commercial product. An amine type.

The data set forth in Table I above show that when an alkali metal hydroxide and an alkali metal tallate soap are used together, the combination thereof is much more effective in resolving water-in-oil emulsions. For example, comparing Runs 1, 2, 4, 5, and 6 with Runs 7 and 8 shows that the combination treating agents of the invention are much more effective than either the alkali metal hydroxide or the alkali metal tallate soap alone.

Example II

Another portion of sodium tallate soap was prepared in the same manner as described in Example I above.

Said sodium tallate soap was used in another series of runs carried out in essentially the same manner as set forth in Example I so as to further evaluate the effectiveness of the combination treating agents of the invention. The emulsion used in these tests was a different sample of the water-in-oil emulsion drawn from the same location as the emulsion described in Example I. The emulsion used in these tests contained about 20 weight percent naphtha and about 80 weight percent water. The amounts of treating agent, settling times, and amounts of water and naphtha phases separated at said settling times are set forth in Table II below.

if it is desired to discharge the water to a sewer system. Thus, said treating agents do not build up in concentration in the naphtha phase and present no problems in reusing said naphtha phase. Said separated naphtha phase is also a clean, clear phase which is essentially completely free of water and can be recycled in the system.

While the invention has been described with particular reference to resolving water-in-oil emulsions wherein the oil is a naphtha, e.g., Stoddard solvent, the treating agents and the method of the invention can be used in resolving water-in-oil emulsions which contain other types of oil. Thus, the oil in the water-in-oil emulsions which can be resolved in accordance with the invention can be an oil from a wide variety of oils, either mineral or vegetable. Examples of other oils include all normally liquid petroleum hydrocarbon materials such as gasoline, kerosene, naphthas, diesel fuels, jet fuels, No. 2 heating oils and heavier fuel oils, crude oils, and also the various vegetable oils. Thus, herein and in the claims, unless otherwise specified, the term "oil" is used generically and includes all types of normally liquid oils, as described above. As indicated, the invention is particularly applicable for resolving water-in-oil emulsions wherein the oil is a petroleum fraction. The invention finds its most useful field of application in connection with water-in-oil emulsions which contain a petroleum fraction boiling within the range of from about 100 to about 700° F.

TABLE II

[Breaking Water-in-Oil Emulsions With Sodium Tallate Soap and/or Sodium Hydroxide]

| | Run Number | | | | | | | | | |
|---|---|---|---|---|---|---|---|---|---|---|
| | 1 | 2 | 3 | 4 | 5 | 6 | 7 | 8 | 9 | 10 |
| Treating Agent: | | | | | | | | | | |
| Sodium Tallate Soap, Wt. percent [1] | 1.0 | 0.5 | 0.0 | 2.5 | 1.25 | 0.0 | 0.75 | 0.25 | 0.0 | 0.3 |
| Sodium Hydroxide, Wt. percent [1] | 0.0 | 0.5 | 1.0 | 0.0 | 1.25 | 2.5 | 0.0 | 0.50 | 0.75 | 0.3 |
| Water Phase Separated—Vol. Percent of Emulsion | | | | | | | | | | |
| Settling Time, minutes: | | | | | | | | | | |
| 5 | 4.0 | 28.0 | 0.0 | | 52.0 | | 10.0 | 74.0 | 4.0 | 20.0 |
| 10 | 6.0 | 44.0 | 1.0 | | 68.0 | 4.0 | 18.0 | | 10.0 | 40.0 |
| 30 | | | | 44.0 | 76.0 | 12.0 | 24.0 | 78.0 | 30.0 | 54.0 |
| 90 | 28.0 | 70.0 | 14.0 | 50.0 | | | 36.0 | 80.0 | 40.0 | 60.0 |
| 180 | | | | | | | 48.0 | | 50.0 | |
| 1,200 | 58.0 | 78.0 | 42.0 | 62.0 | 76.0 | 40.0 | | 80.0 | | 62.0 |
| Naphtha Phase Separated—Vol. Percent of Emulsion | | | | | | | | | | |
| Settling Time, minutes: | | | | | | | | | | |
| 5 | 0.0 | 0.0 | 0.0 | | 4.0 | 0.0 | 0.0 | 10.0 | 0.0 | 0.0 |
| 10 | 0.0 | 4.0 | 0.0 | 0.0 | 8.0 | | 0.0 | | 0.0 | 2.0 |
| 30 | | | | | 14.0 | 0.0 | 0.0 | 14.0 | 0.0 | 8.0 |
| 90 | 0.0 | 16.0 | 1.0 | 0.0 | 15.0 | | 0.0 | 16.0 | 2.0 | 15.0 |
| 180 | | | | | | | 2.0 | | 4.0 | |
| 1,200 | 12.0 | 20.0 | 18.0 | 10.0 | 17.0 | 12.0 | | 19.5 | | 20.0 |

[1] Dry basis, based on weight of emulsion.

In the practice of the invention, the water phase separates as a clean, clear water which is essentially completely free of naphtha. The quality of said separated water phase is more than sufficient to permit its reuse in a plant water system, e.g., cooling water, or its discharge into sewer systems for disposal. Still another advantage of the invention is that the treating agents are water soluble and remain in said water phase. Said treating agents are biodegradable, and since they are used in very small quantities they present no pollution problems While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for resolving a water-in-oil emulsion, wherein said oil is a petroleum fraction boiling within the range of from about 100 to about 700° F., to enable troleum fraction having a viscosity of at least 90 SUS at 210° F. will produce metal petroleum sulfonates which are satisfactory for many purposes. The deasphalted and solvent-refined petroleum fractions having a viscosity of about 140 to about 720 SUS at 210° F. are preferred. A presently more preferred sulfonation charge stock is a propane fractionated, solvent extracted, and dewaxed Mid-Continent oil of about 200 to about 230 SUS at 210° F. and having a viscosity index of about 85 to 100, or higher.

The sulfonating agents which can be used include fuming sulfuric acid and liquid $SO_3$ dissolved in liquid $SO_2$. Sulfonation temperatures can be controlled within the range being between about 80 and about 150° F. With 20 percent fuming sulfuric acid as the sulfonating agent, the acid-oil weight ratio can be in the range from about 0.1:1 to about 0.7:1 or even 1:1 to produce the metal petroleum sulfonates. When $SO_3$ in $SO_2$ is the sulfonation agent. $SO_3$-oil weight ratios are maintained equivalent to those available from the 20 percent fuming sulfuric acid ratios given above. In other words, the $SO_3$-oil ratio can be in the range of from about 0.02:0.2 with the more preferred range being about 0.06 to 0.12.

A brief description of the process of said Whitney et al. patent as illustrated in the attached drawing is included in order to illustrate the application of the present invention thereto. Said drawing is a diagrammatic flow sheet and many pumps, valves, flow control instruments, and other items of equipment, not necessary for explaining the invention to those skilled in the art, have been omitted for the sake of brevity.

In one embodiment of the process of said Whitney et al. patent, a petroluem hydrocarbon fraction as hereinbefore described is introduced to reactor 10 via conduit 11 and sulfur trioxide is introduced to reactor 10 via conduit 13. Each stream is diluted with sulfur dioxide and the two diluted streams are mixed as they enter the reactor 10. When fuming sulfuric acid is utilized as the sulfonating agent, the sulfur dioxide is usually omitted and the hydrocarbon fraction is diluted, if desired, with a low boiling liquid hydrocarbon. Cooling water is introduced to the indirect heat exchange jacket of reactor 10 via conduit 14 and is removed therefrom via conduit 15 so as to maintain the reaction temperature at about 110 to 130° F. The effluent from reactor 10 is passed to time tank 16 for completion of the reaction, in case fuming sulfuric acid is utilized as the sulfonating agent, and thence to flash tank 17 where sulfur dioxide is vaporized and removed via conduit 18 for reuse. When the sulfonating agent is sulfur trioxide, the time tank 16 can be completely bypassed by closing valve 41 in line 16a and opening valve 42 in line 16b; or intermediate portions of time tank 16 can be employed by leaving valve 42 closed and valve 41 open and closing valve 43 and opening any one of valves 44, 45, or 46. The substantially sulfur dioxide-free reaction product removed from flash tank 17 is then passed via conduit 19 to neutralizer 20 wherein the reaction product is admixed with naphtha introduced via conduit 21 and an aqueous slurry of a basic compound of a metal, e.g., lime (calcium hydroxide), introduced via conduit 22. The slurry of reaction product, naphtha, lime and water, removed from neutralizer 20 is passed via conduit 23 and heater 24 to stabilizer 25, maintained at a temperature of about 360–400° F. for about 10 to 20 minutes for completion of the neutralization reaction. The neutralized slurry is passed via conduit 26 to dryer tower 27 where water, and at least a portion of said naphtha, are removed overhead via conduit 28. The dryer tower bottoms are removed via conduit 29, diluted with naphtha via conduit 30 and passed to precoat filter 31 for removal of lime and other inorganic solids such as calcium sulfate. The filter 31 is precoated with filter aid introduced via conduit 32 periodically as is conventional with precoat filters. The dried plant balance calcium petroleum sulfonate, diluted with naphtha, is removed from the filter via conduit 33 and passed to stripper 34. Naphtha is removed from stripper 34 via conduit 35. Petroleum sulfonate, plant balance, as finished product is removed from naphtha stripper 34 via conduit 36. Naphtha is recovered from drying the filter cake and is passed via conduit 37 to conduit 38. Naphtha in conduits 28, 35 and 37 is condensed in a condenser not shown and passed via conduit 38 to separator 39, where water is removed, and then to naphtha storage 40.

In the operation of the above-described process, difficulty with the formation of emulsions in conduits 28 and 38 are frequently encountered in varying degrees of severity. Said emulsions flow into separator 39 and seriously reduce the capacity and efficiency thereof. Said emulsions are of the water-in-oil type and are very stable unless steps are taken to resolve same. Said emulsions can comprise from about 30 to about 97 weight percent water and from 70 to 3 percent naphtha. The naphtha phase usually contains from 0.01 to 0.5, more usually from 0.01 to 0.1 weight percent of the metal petroleum sulfonate which acts as an emulsifying agent.

The present invention eliminates said difficulties. In the practice of the present invention, an alkali metal hydroxide and an alkali metal tallate soap are introduced via conduit 50 into said conduit 38, either separately or in admixture together. If desired, the stream in said conduit 38, now containing said hydroxide and said soap, can be passed through the mixing conduit having orifice mixer 54 or other mixing means disposed therein for mildly agitating and dispersing said soap and said hydroxide in the emulsion. Also, if desired, said soap and said hyroxide can be introduced directly into separator 39 by means of a suitable conduit, not shown. It will also be understood that said separator 39 can include suitable means for mildly agitating the contents thereof. Thus, in one aspect, the present invention comprises an improvement on the invention of said Whitney et al. Patent 3,135,693.

The following examples will serve to further illustrate the invention.

Example I

A sodium tallate soap was prepared by dissolving 2.4 grams of sodium hydroxide in 52 milliliters of water. The resulting solution was then added slowly, with stirring, to a mixture of 20 grams of the above-described commercially available Acintol D29LR Distilled Tall Oil and 40 milliliters of water, at a temperature of about 80° F. The resulting solution contained about 20 weight percent of sodium tallate soap. This solution was used in Runs 1, 7, and 8 described below.

A potassium tallate soap was prepared in the same manner as said sodium tallate soap except that a solution of 3.5 grams of potassium hydroxide dissolved in 54 grams of water was used instead of said sodium hydroxide solution. The resulting potassium tallate soap solution was used in Run 2 described below.

A series of runs was carried out in which various candidate treating agents for emulsions were evaluated in resolving a stable water-in-oil emulsion. The emulsion utilized in these tests was a sample of the water-in-naphtha emulsion which forms in conduits 28 and 38 and/or separator 39 as described above in connection with the drawing, and was comprised of about 5 weight percent naphtha and about 95 weight percent water. In each run, 50 grams of said emulsion was placed in a 100 milliliter graduated cylinder. To this sample of emulsion the candidate treating agent was added in aqueous solution in an amount sufficient to give the desired amount of active treating agent. The cylinder was then stoppered, and inverted slowly two or three times to provide mild agitation and disperse the treating agent in the emulsion. The cylinders were then allowed to remain quiescent. The time required for the emulsion to start breaking was observed, and the percent of emulsion broken at different intervals of time was noted. Run 8 was carried out at 120° F. by placing the cylinder in a water bath maintained at this temperature.

recovery of the components thereof, which process comprises: adding an alkali metal tallate soap to said emulsion; adding an alkali metal hydroxide to said emulsion; said soap and said hydroxide being added in a soap to hydroxide weight ratio within the range of from 1:9 to 9:1, and in a small but effective total amount which is sufficient to substantially completely resolve said emulsion.

2. A process according to claim 1 wherein said soap is potassium tallate soap and said hydroxide is potassium hydroxide.

3. A process according to claim 2 wherein said soap is sodium tallate soap and said hydroxide is sodium hydroxide.

4. A process according to claim 3 wherein said soap to hydroxide wieght ratio is within the range of from about 1:1 to about 1:3.

5. A process for resolving a water-in-oil emulsion, wherein said oil is a petroleum fraction boiling within the range of from about 100 to about 700° F., to enable recovery of the components thereof, which process comprises: adding an alkali metal hydroxide to said emulsion; adding an alkali metal tallate soap to said emulsion; said soap and said hydroxide being added in a soap to hydroxide weight ratio within the range of from 1:9 to 9:1, and in a total amount within the range of from 0.1 to 3 percent by weight of said emulsion; and recovering the separated water and oil components of said emulsion.

6. A process according to claim 5 wherein said soap is potassium tallate soap and said hydroxide is potassium hydroxide.

7. A process according to claim 6 wherein said soap is sodium tallate soap and said hydroxide is sodium hydroxide.

8. A process according to claim 7 wherein said soap to hydroxide weight ratio is within the range of from about 1:1 to about 1:3.

9. A process for resolving a water-in-oil emulsion, wherein said oil is a petroleum fraction boiling within the range of from about 100 to about 700° F., to enable recovery of the water and oil components thereof, which process comprises: adding an alkali metal tallate soap to a flowing stream of said emulsion; adding an alkali metal hydroxide to said flowing stream of emulsion; said soap and said hydroxide being added in a soap to hydroxide weight ratio within the range of from 1:9 to 9:1, and in a small but effective total amount which is sufficient to substantially completely resolve said emulsion; passing said flowing stream containing said soap and said hydroxide to a separation zone wherein separation of said water and oil components is substantially completed; and removing said separated components from said separation zone.

10. A process for resolving a water-in-oil emulsion, wherein said oil is a petroleum fraction boiling within the range of from about 100 to about 700° F., to enable recovery of the water and oil cmoponents thereof, which process comprises: adding sodium tallate soap to a flowing stream of said emulsion; adding sodium hydroxide to said flowing stream of emulsion; said soap and said hydroxide being added in a soap to hydroxide ratio within the range of from about 1:1 to 1:3, and in a small but effective total amount within the range of from 0.1 to 3 percent by weight of said emulsion and which is sufficient to substantially completely resolve said emulsion; passing said flowing stream containing said soap and said hydroxide to a separation zone wherein separation of said water and oil components is substantially completed; and removing said separated components from said separation zone.

11. A process for resolving a water-in-oil emulsion, wherein said oil is a petroleum fraction boiling within the range of from about 100 to about 700° F., to enable recovery of the water and oil components thereof, which process comprises: adding sodium tallate soap to said emulsion contained in a separation zone; adding sodium hydroxide to said emulsion in said separation zone; said soap and said hydroxide being added in a soap to hydroxide ratio within the range of from 1:9 to 9:1, and in a small but effective total amount within the range of from 0.1 to 3 percent by weight of said emulsion and which is sufficient to substantially completely resolve said emulsion; mildly agitating said emulsion containing said soap and said hydroxide in said separation zone; then maintaining said emulsion quiescent to permit separation of said water and oil components; and removing said separated components from said separation zone.

References Cited

UNITED STATES PATENTS

| | | | |
|---|---|---|---|
| 2,224,228 | 12/1940 | Lunn et al. | 252—329 |
| 2,481,356 | 9/1949 | Segessemann | 260—97.5 |
| 3,033,898 | 5/1962 | Bray | 260—504 |
| 3,135,693 | 6/1964 | Whitney et al. | 260—504 |

LEON D. ROSDOL, *Primary Examiner.*

H. B. GUYNN, *Assistant Examiner.*